United States Patent Office 2,855,447
Patented Oct. 7, 1958

2,855,447

POLYMERIZATION OF NORMALLY GASEOUS OLEFINS

William K. Griesinger, Drexel Hill, and John C. Reid, Wynnewood, Pa., assignors to The Atlantic Refining Company, Philadelphia, Pa., a corporation of Pennsylvania No Drawing. Application August 5, 1954
Serial No. 448,117

4 Claims. (Cl. 260—683.15)

The present invention relates to the polymerization of low molecular weight olefinic hydrocarbons and the products resulting therefrom. In a more specific aspect, the present invention relates to the polymerization of normally gaseous olefinic hydrocarbons in the presence of a novel promoting agent therefor. In a still more specific aspect, the present invention relates to a method of initiating a polymerization reaction wherein normally gaseous olefinic hydrocarbons are converted to valuable polymers. A still more specific aspect of the present invention relates to a method of initiating and maintaining a polymerization reaction wherein propylene and gaseous mixtures containing the same are converted to liquid polymers in the presence of a novel promoting agent, and to the polymer products obtained therefrom.

Many methods are disclosed in the prior art for preparing polymers from low molecular weight olefinic hydrocarbons by catalytic and non-catalytic polymerization thereof. For example, normally gaseous olefinic hydrocarbons, such as ethylene, propylene, and butene, have heretofore been converted to liquid polymers by polymerization in the presence of $H_3PO_4$ as a reaction promoter. However, polymerization reactions catalyzed by $H_3PO_4$ sometimes result in low conversion of olefins to polymers, and it is difficult to control such reactions to produce polymers having predetermined characteristics. Various forms of halide compounds, such as $BF_3$, have also been proposed as catalysts for the polymerization of gaseous olefinic hydrocarbons. Typical $BF_3$-type catalysts include: anhydrous $BF_3$, mixtures of $BF_3$ and oxygen-containing, polar, organic compounds, $BF_3$-acetic acid complexes, $BF_3$-etherate complexes and $BF_3$ hydrates. Although some of these $BF_3$-type catalysts are capable of producing high yields of polymers for short periods of time, polymerization processes utilizing such catalysts have not in general proven to be commercially feasible. One major difficulty which has been experienced in the polymerization of olefins with $BF_3$-type catalysts is the impossibility of maintaining consistently high yields of polymer. In addition, $BF_3$ is a comparatively expensive material, and the catalyst requirements of such processes are so excessive that catalyst cost becomes a prohibitive factor. Further, lack of control over the reaction makes it extremely difficult to control the nature of the polymer product. On the one hand, polymers of an extremely broad molecular weight range are generally obtained; and, in addition, under substantially the same conditions the molecular weight range of the polymers may be either higher or lower than the product desired. In any event, the operator has little control over the final product and cannot readily produce a polymer having a predetermined molecular weight which is not excessively broad. This last drawback of $BF_3$-type catalysts is particularly vexing when the polymers are to be converted to sulfonate-type detergents by alkylation, acidization and neutralization.

It is, therefore, an object of the present invention to provide an improved process for the polymerization of low molecular weight olefinic hydrocarbons.

Another object of the present invention is to provide an improved process for the polymerization of low molecular weight olefinic hydrocarbons, wherein consistently high yields of product are obtained.

Still another object of this invention is to provide an improved process for the polymerization of low molecular weight olefinic hydrocarbons wherein the molecular weight range of the product may be readily controlled and confined to comparatively narrow limits.

Another and further object of the present invention is to provide a process for the polymerization of low molecular weight olefinic hydrocarbons wherein high yields of polymers having a predetermined, narrow molecular weight range are obtained.

A further object of the present invention is to provide a method for the polymerization of normally gaseous olefinic hydrocarbons wherein high yields of polymers having 12 through 15 carbon atoms per molecule are obtained, and the yield of polymers having less than 12 carbon atoms per molecule is suppressed.

A still further object of the present invention is to provide a method for polymerizing low molecular weight olefinic hydrocarbons wherein a novel catalyst is employed.

Another object of the present invention is to provide a process for the polymerization of low molecular weight olefinic hydrocarbons wherein catalyst requirements are substantially reduced.

Still another object of the present invention is to provide a method for producing a highly active catalyst for the polymerization of low molecular weight olefinic hydrocarbons.

A further object of the present invention is to provide a method for producing a highly active polymerization catalyst containing $BF_3$ as an active ingredient.

Another object of the present invention is to provide a method for producing a highly active polymerization catalyst and for maintaining the activity of such catalyst during the polymerization of low molecular weight olefinic hydrocarbons.

A further object of the present invention is to provide a method for initiating a reaction for the polymerization of low molecular weight olefinic hydrocarbons.

Another and further object of the present invention is to provide a method for initiating and maintaining a continuous reaction for polymerizing low molecular weight olefinic hydrocarbons.

A still further object of the present invention is to provide a method for initiating and maintaining a continuous polymerization reaction wherein high yields of polymers having a predetermined narrow molecular weight range are obtained from low molecular weight olefinic hydrocarbons.

Still another object of the present invention is to provide a method for initiating and maintaining a continuous polymerization reaction wherein high yields of polymers having 12 through 15 carbon atoms per molecule and low yields of polymers having less than 12 carbon atoms per molecule are obtained from normally gaseous olefinic hydrocarbons.

A further object of the present invention is to provide a superior polymeric composition.

Another object of the present invention is to provide a polymeric composition having less than about 20 percent by weight of polymers having less than 12 carbon atoms per molecule.

A still further object of the present invention is to provide a polymeric composition having less than about 20 percent by weight of polymers boiling below 333° F.

Still another object of the present invention is to provide a polymeric composition having in excess of 50 percent by weight of polymers having from 12 to 15 carbon atoms per molecule and less than 20 percent by weight of polymers having less than 12 carbon atoms per molecule.

A further object of the present invention is to provide a polymeric composition having in excess of 50 percent by weight of polymers boiling in the range of 333° F. to 518° F. and less than 20 percent by weight of polymers boiling below 333° F.

Another and further object of the present invention is to provide a polymeric composition suitable for use in the preparation of superior sulfonate-type detergents.

Other and further objects of the present invention will be obvious to those skilled in the art by a review of the following detailed description of the instant invention.

The term "adduct" as used in this specification and the appended claims is meant to include compositions formed by the polymerization of normally gaseous hydrocarbons in the presence of water and $BF_3$, whether such compositions be physical mixtures of these components, reaction products thereof, or complexes of undefinable nature.

"Sulfonate-type detergents" is employed herein to define non-soap products having detergent properties which are formed by alkylating a suitable base stock, sulfonating such alkylated products and subsequently neutralizing the resultant sulfonic acids to produce sulfonate salts.

It has been discovered, in accordance with the present invention, that low molecular weight olefinic hydrocarbons can be converted to superior polymeric compositions by contacting such hydrocarbons or mixtures of such hydrocarbons and other low molecular weight hydrocarbons with an adduct of water, $BF_3$ and a mixture of hydrocarbons at elevated temperatures and pressures. It has also been discovered that the activity of these adducts as polymerization promoters may be maintained practically indefinitely by continuously or intermittently adding small amounts of water and $BF_3$ during the course of the polymerization reaction.

The adduct promoters of this invention are conveniently prepared by contacting a low molecular weight olefinic hydrocarbon, mixtures of low molecular weight olefinic hydrocarbons, or a mixture of low molecular weight olefinic hydrocarbons and other low molecular weight hydrocarbons with $BF_3$ and water under polymerization conditions. The resultant adduct formed by this operation is a liquid material having a viscosity resembling that of a light motor oil. Although the exact nature of the above-mentioned adducts cannot be definitely established, it is believed that these adducts are complexes containing water, $BF_3$ and a mixture of hydrocarbons of indeterminate nature. Analysis of typical adducts, useful in accordance with the instant invention, reveals that the adduct contains in the neighborhood of 40 percent to 55 percent by weight of equivalent $BF_3$ based on fluoride or boric acid analyses, 7 percent to 15 percent by weight of water, and 30 percent to 53 percent by weight of a hydrocarbon mixture. The last-mentioned component is believed to be a hydrocarbon material averaging about 15 carbon atoms per molecule and containing above about 50 percent of olefins which are predominantly polyolefins.

The nature of the instant invention will be apparent from a consideration of the following examples and comparative data. Although the examples contained herein are directed to the use of particular reaction stocks and reaction conditions, it is to be understood that these examples are not to be construed as limiting and that other reactant materials and conditions of reaction as defined hereinafter and in the appended claims may be employed.

EXAMPLE I

A number of polymerization reactions were conducted on a typical refinery $C_3$ gas stream obtained in the thermal and catalytic cracking of hydrocarbon oils and having the following approximate analysis:

| Constituent | Mol Percent | Average Mol Percent |
|---|---|---|
| Methane | 0–4.0 | 1.9 |
| Ethylene | 1.1–7.4 | 3.3 |
| Ethane | 6.7–20.9 | 14.1 |
| Propylene | 27.5–43.5 | 36.8 |
| Propane | 36.5–53.0 | 43.5 |
| Butene | 0–1.0 | 0.1 |
| Butane | 0–2.7 | 0.4 |

This material is substantially saturated with water at ambient temperatures and a pressure of about 300 p. s. i. g., generally containing about 0.02 percent to 0.05 percent by weight of water.

In one series of batch polymerizations, the above-mentioned gaseous mixture was contacted with varying amounts of gaseous $BF_3$ under varying conditions of temperature and pressure. The results of this series of reactions, together with the conditions of operation are shown in Table I below:

Table I

| Run Number | Mol Percent $BF_3$ on $C_3H_6$ Feed | Temperature, °F. | Pressure, p. s. i. g. | Wt. Percent Polymer on $C_3H_6$ Feed |
|---|---|---|---|---|
| 1 | 3.16 | 100–110 | 285–315 | 45.3 |
| 2 | 2.11 | 100–105 | 323–335 | 24.4 |
| 3 | 1.49 | 125 | 410–430 | [1] 104.0 |
| 4 | 1.61 | 135–137 | 465–485 | 98.8 |
| 5 | 2.92 | 150 | 460–500 | 96.0 |
| 6 | 2.61 | 162–163 | 535–560 | 8.8 |
| 7 | 1.61 | 162–163 | 570–610 | 30.6 |
| 8 | 1.55 | 162–163 | 540–600 | [1] 104.0 |
| 9 | 1.74 | 175 | 610–667 | 55.5 |
| 10 | 2.24 | 175 | 595–665 | 53.3 |
| 11 | 1.86 | 190 | 760–790 | 10.9 |
| 12 | 4.15 | 200 | 500–575 | 27.2 |

[1] Polymer yields in excess of 100 percent are due to slight polymerization of ethylene and/or the accuracy of the measurements which are within the range of ±5%.

The erratic nature of polymerization in the presence of gaseous $BF_3$ is clearly shown by the polymer yields obtained in runs 1 through 12 of Table I. It is to be observed from Table I that temperatures and pressures apparently have little effect on the polymer yield when using gaseous $BF_3$ and particularly that the amount of $BF_3$ employed has little bearing on the polymer yield. In runs 7 and 8 substantially the same temperatures, pressures and $BF_3$ concentrations were employed, yet a 30.6 percent polymer yield was obtained in run 7 while a 104 percent yield was obtained in run 8. Likewise, in run 5 a 96 percent polymer yield was obtained using 2.92 mole percent of $BF_3$, while only 8.8 percent yield was obtained in run 6 when a slightly smaller concentration of $BF_3$ and slightly increased temperatures and pressures were employed.

EXAMPLE II

In addition to gaseous $BF_3$, complexes of $BF_3$ and acetic acid and $BF_3$-etherate complexes have also been suggested as polymerization catalysts. Table II illustrates the results obtained using varying concentrations of commercially available catalysts of these types with the feed gas employed in the runs of Example I.

*Table II*

| Run No. | Catalyst | Mol Percent $BF_3$ on $C_3H_6$ Feed | Temperature, °F. | Pressure, p. s. i. g. | Weight Percent Polymer on $C_3H_6$ Feed |
|---|---|---|---|---|---|
| 1 | $BF_3$-Acetic Acid. | 9.62 | 150–170 | 530–610 | 41.6 |
| 2 | ----do--------- | 11.3 | 175–190 | 540–730 | 77.7 |
| 3 | ----do--------- | 10.0 | 190–200 | 630–800 | 84.3 |
| 4 | $BF_3$-Etherate | 6.52 | 150 | 530–600 | 27.9 |
| 5 | ----do--------- | 8.2 | 150 | 540 | 16.1 |
| 6 | ----do--------- | 8.5 | 175 | 620–720 | 50.6 |
| 7 | $BF_3$-Etherate ($BF_3$ Sat.) | 6.83 | 150 | 550–560 | 35.6 |
| 8 | ----do--------- | 6.7 | 125 | 690–760 | 41.0 |

Comparing the results shown in Tables I and II it is apparent that, except for the erratic nature of the reaction, polymerization in the presence of gaseous $BF_3$ is superior to polymerization in the presence of $BF_3$ complexes.

EXAMPLE III

In order to further demonstrate the superiority of gaseous $BF_3$ as a catalyst, two runs were made using 48 percent aqueous HF and $BF_3$, respectively, on a solid phosphoric acid catalyst. In the first of these runs a temperature of 175° F. and a pressure of 700–735 p. s. i. g. were employed, while the second run was made at a temperature of 175° F., a pressure of 680–700 p. s. i. g. and a $BF_3$ concentration of 3.62 mol percent based on $C_3H_6$ feed. Both of these runs failed to produce a polymer product.

Therefore, it is readily apparent that gaseous $BF_3$ is far superior to other known $BF_3$ type catalysts in the polymerization of gaseous hydrocarbons. However, it is just as obvious that some modification of the gaseous $BF_3$ catalyst itself or the polymerization reaction is necessary in order to obtain consistently high yields of polymer products and to produce a polymer product of predictable nature and high quality.

One such modification which has been casually suggested in the prior art is the addition of small amounts of water to the gaseous $BF_3$ or to the reaction chamber mixture. However, such suggestions lack the required degree of specificity to define a practicable process which can be adapted to commercial use; and, even assuming a definite commercial scale process can be based on these suggestions, other inherent factors of the process make it commercially unattractive. For example, U. S. P. No. 2,357,926 to L. A. Bannon teaches that a liquid comprising one to five mols of water per mol of $BF_3$ is effective in the polymerization of gaseous olefins by a semi-batch procedure. The fallacy of this teaching, together with its unfitness for commercial operation, is demonstrated by the following examples.

EXAMPLE IV $BF_3$ hydrates were prepared by bubbling $BF_3$ through a known weight of water until a predetermined mole ratio of water per mol of $BF_3$ was reached. In this fashion $BF_3$ hydrates containing 1.12, 1.30, 1.45, 1.91, 3.06 and 4.97 mols of water per mol of $BF_3$ were prepared. These $BF_3$ hydrates were then employed in the polymerization of the refinery by-product gas stream employed in the previous examples and the results of these runs are shown in Table III below:

*Table III*

| Run No. | Catalyst | Mol Percent $BF_3$ on $C_3H_6$ | Temperature, °F. | Pressure, p. s. i. g. | Weight Percent Polymer on $C_3H_6$ |
|---|---|---|---|---|---|
| 1 | $BF_3$·1.12 $H_2O$ | 17.4 | 95 | 285–350 | 28.2 |
| 2 | $BF_3$·1.12 $H_2O$ | 20.5 | 150–165 | 510–615 | 111.0 |
| 3 | $BF_3$·1.12 $H_2O$ | 18.4 | 175–199 | 530–690 | 99.5 |
| 4 | $BF_3$·1.12 $H_2O$ | 23.4 | 175–225 | 580–770 | 97.4 |
| 5 | $BF_3$·1.12 $H_2O$ | 19.6 | 175–215 | 560–690 | 117.0 |
| 6 | $BF_3$·1.30 $H_2O$ | 13.6 | 83–88 | 270–300 | 27.6 |
| 7 | $BF_3$·1.30 $H_2O$ | 20.0 | 125–130 | 390–430 | 91.4 |
| 8 | $BF_3$·1.30 $H_2O$ | 16.9 | 175–195 | 540–710 | 109.0 |
| 9 | $BF_3$·1.30 $H_2O$ | 17.2 | 175–195 | 540–710 | 109.0 |
| 10 | $BF_3$·1.45 $H_2O$ | 13.6 | 150–155 | 550–600 | 49.4 |
| 11 | $BF_3$·1.45 $H_2O$ | 14.7 | 175–190 | 575–765 | 87.5 |
| 12 | $BF_3$·1.45 $H_2O$ | 24.5 | 175–180 | 600–735 | 82.5 |
| 13 | $BF_3$·1.45 $H_2O$ | 15.4 | 175–190 | 550–710 | 110.0 |
| 14 | $BF_3$·1.91 $H_2O$ | 15.5 | 175 | 620–735 | 68.0 |
| 15 | $BF_3$·3.06 $H_2O$ | 9.8 | 175 | 680–725 | 39.9 |
| 16 | $BF_3$·4.97 $H_2O$ | 10.5 | 175–180 | 680–705 | No Product |

In each of the runs listed in Table III the conditions of operation were adjusted to obtain the maximum yield of polymer which could be obtained with a given $BF_3$ hydrate. The most significant observation to be made in view of the runs set forth in Table III is that extremely high concentrations of $BF_3$ are required to obtain high polymer yields. Also of significance is the fact that these runs were made by a batch operation, and it is generally conceded that batch procedures are not commercially feasible in this type of process.

It is, therefore, not only highly desirable, but essential to the production of high yields of high quality polymers on a commercial scale that the process be continuous and the required quantities of $BF_3$ be substantially reduced. However, the results of a series of experiments, set forth in Example IV below, show conclusively that merely adding measured amounts of $BF_3$ and water to a continuous reaction system will not accomplish this result.

EXAMPLE IV A

The runs summarized in Table IV were carried out by metering measured amounts of $BF_3$ to the reactor and passing a portion of the gaseous feed through water to absorb measured amounts of water. The same refinery by-product gases employed in the previous examples were utilized in this series of runs.

Table IV

| Run No. | Mol Percent $BF_3$ on $C_3H_6$ | Wt. Percent $H_2O$ on Total $C_3$'s | Temp., °F. | Pressure, p. s. i. g. | Wt. Percent Polymer on $C_3H_6$ |
|---|---|---|---|---|---|
| 1 | 0.31 | 0.02 | 165 | 500 | 28 |
| 2 | 0.33 | 0.15 | 193 | 500 | 37 |
| 3 | 0.34 | 0.19 | 196 | 450 | 28 |
| 4 | 0.35 | 0.27 | 157 | 500 | 6 |
| 5 | 0.36 | 0.04 | 169 | 500 | 42 |
| 6 | 0.36 | 0.22 | 200 | 500 | 63 |
| 7 | 0.38 | 0.08 | 164 | 500 | 21 |
| 8 | 0.38 | 0.02 | 163 | 500 | 29 |
| 9 | 0.40 | 0.10 | 217 | 500 | 75 |
| 10 | 0.40 | 0.17 | 168 | 500 | 53 |
| 11 | 0.40 | 0.42 | 167 | 500 | 29 |
| 12 | 0.41 | 0.41 | 167 | 500 | 27 |
| 13 | 0.41 | 0.24 | 197 | 500 | 71 |
| 14 | 0.42 | 0.15 | 203 | 500 | 75 |
| 15 | 0.43 | 0.45 | 170 | 500 | 31 |
| 16 | 0.47 | 0.09 | 201 | 500 | 75 |
| 17 | 0.50 | 0.01 | 203 | 500 | 80 |
| 18 | 0.50 | 0.10 | 208 | 500 | 76 |
| 19 | 0.50 | 0.11 | 203 | 500 | 72 |
| 20 | 0.50 | 0.11 | 203 | 500 | 66 |
| 21 | 0.50 | 0.43 | 162 | 500 | 21 |
| 22 | 0.51 | 0.02 | 162 | 500 | 36 |
| 23 | 0.51 | 0.16 | 203 | 475 | 60 |
| 24 | 0.51 | 0.10 | 207 | 500 | 48 |
| 25 | 0.52 | 0.07 | 205 | 500 | 69 |
| 26 | 0.53 | 0.06 | 206 | 500 | 64 |
| 27 | 0.53 | 0.52 | 166 | 500 | 39 |
| 28 | 0.62 | 0.02 | 162 | 500 | 36 |
| 29 | 0.63 | 0.03 | 165 | 500 | 39 |
| 30 | 0.66 | 0.14 | 212 | 500 | 34 |
| 31 | 0.74 | 0.41 | 177 | 500 | 34 |
| 32 | 3.4 | 0.58 | 218 | 500 | 63 |
| 33 | 3.6 | 0.44 | 156 | 500 | 94 |
| 34 | 3.6 | 0.32 | 154 | 500 | 16-52 |
| 35 | 3.6 | 0.00 | 151 | 500 | 20 |
| 36 | 3.6 | 0.09 | 163 | 500 | 73 |
| 37 | 3.8 | 0.10 | 185 | 500 | 95 |
| 38 | 3.9 | 0.86 | 207 | 500 | 113 |
| 39 | 4.0 | 0.75 | 207 | 500 | 106 |
| 40 | 4.0 | 0.80 | 210 | 500 | 95 |
| 41 | 4.2 | 0.04 | 208 | 500 | 86 |
| 42 | 4.2 | 0.05 | 198 | 500 | 108 |
| 43 | 4.3 | 0.05 | 207 | 500 | 114 |
| 44 | 4.5 | 0.24 | 194 | 500 | 49 |
| 45 | 4.5 | 0.01 | 210 | 500 | 119 |
| 46 | 4.5 | 0.02 | 199 | 500 | 111 |
| 47 | 5.0 | 0.53 | 201 | 500 | 101 |
| 48 | 5.1 | 0.00 | 203 | 500 | 105 |
| 49 | 5.1 | 0.42 | 193 | 500 | 76 |
| 50 | 5.1 | 0.62 | 204 | 500 | 84 |
| 51 | 9.4 | 0.39 | 157 | 500 | 105 |
| 52 | 9.4 | 0.96 | 155 | 500 | 107 |
| 53 | 9.6 | 0.00 | 147 | 500 | 7 |
| 54 | 12.3 | 0.90 | 205 | 500 | 114 |
| 55 | 12.7 | 0.69 | 214 | 500 | 108 |

The results shown in Table IV illustrate that, although yields of polymer in the neighborhood of 100 weight percent based on propylene can be obtained in short continuous runs at $BF_3$ concentrations in excess of 3.6 mol percent by properly adjusting the reaction conditions and the water content of the reaction mixture, $BF_3$ concentrations below about 1.0 mol percent fail to produce polymer quantities better than about 80 percent by weight based on propylene, and even at this low conversion rate the results are erratic and unpredictable regardless of any manipulation of conditions or water content.

In accordance with the instant invention, the surprising and unexpected discovery has been made that an adduct comprising a mixture of $BF_3$, water and hydrocarbons, formed by contacting an olefinic hydrocarbon, a mixture of olefinic hydrocarbons or a mixture of olefinic and non-olefinic hydrocarbons with small amounts of $BF_3$ and water under polymerization conditions, is an excellent catalyst for the polymerization of normally gaseous olefins. By employing the novel polymerization catalyst, in accordance with the instant invention, consistently high yields of high quality polymers can be obtained from normally gaseous olefinic hydrocarbons. In order to demonstrate the effectiveness of the novel promoter of this invention, a series of runs were made in which the adduct promoter was employed as the sole catalyst and no $BF_3$ or water was added to the reactor.

EXAMPLE V

Two runs were made for the purpose of producing adduct for use in the experimental runs. In these two runs the gaseous mixture employed in previous examples was contacted with 3.7 to 3.9 mol percent of $BF_3$ based on propylene in the feed and 0.125 percent of 0.128 percent by weight of water based on the total $C_3$ content of the gaseous feed at temperatures of 188° F. to 189° F. and a pressure of 500 p.s.i.g.

In the first run 500 grams, representing slightly above 50 percent of the reactor volume, of the adduct produced above was charged to the reactor. Gaseous hydrocarbon feed was then fed to the reactor at a rate of about 40 C. F. H. and a temperature of 180° F. and a pressure of 500 p.s.i.g. were maintained. A polymer product yield of 100 weight percent based on propylene feed was maintained for 12 hours and decreased slowly thereafter.

A second run was made in which an adduct separator was placed in the product discharge line and entrained adduct was separated from the product and recycled to the reactor. In this run 902 grams of adduct was charged to the reactor, a gas feed rate of 40 C. F. H. was employed, and a temperature of 192° F. and a pressure of 500 p.s.i.g. were maintained. 116 mol percent of polymer based on propylene charge was produced for a period of 20 hours at which time the run was terminated. The polymer yield did however drop several percent during the last two hours of operation indicating that the activity of the adduct promoter was decreasing slightly.

It has also been discovered that the activity of the novel catalyst of the instant invention can be maintained at a high level almost indefinitely and/or regenerated by continuously or intermittently adding comparatively small amounts of $BF_3$ and water to the reactor.

EXAMPLE VI

A series of pilot plant runs under varying conditions of adduct concentration and $BF_3$ and water addition illustrate the preferred operation in accordance with the present invention. In order to illustrate the variabilities of operation which can be employed in accordance with the present invention without affecting the high polymer yields obtained, runs 6 through 22 inclusive were made while separating entrained adduct from the polymer product and recycling this separated adduct to the reactor; and runs 12 through 14 and 17 through 22 inclusive were made while recycling reaction mixture from the product discharge line to the reactor at a point near the reactant inlet at a rate of about 16 to 20 gallons per hour. Although neither of these variations are necessary to the efficient operation of the instant process, the first procedure serves to salvage small amounts of adduct which would ordinarily be lost while the second procedure aids in the maintenance of a more nearly constant temperature throughout the reactor chamber. The results of these runs together with the reaction conditions employed are summarized in Table V below:

Table V

| Run No | 1 | 2 | 3 | 4 | 5 | 6 | 7 | 8 | 9 | 10 | 11 |
|---|---|---|---|---|---|---|---|---|---|---|---|
| Duration In Hours | 70.9 | 23.6 | 64.6 | 39.0 | 18.2 | 33.6 | 18.4 | 21.9 | 10.0 | 13.0 | 14.0 |
| Aver. Max. Temp., °F | 187 | 181 | 186 | 182 | 181 | 185 | 183 | 188 | 171 | 221 | 172 |
| Pressure, p. s. i. g | 500 | 500 | 500 | 500 | 500 | 500 | 500 | 500 | 500 | 500 | 500 |
| Mol Percent $BF_3$ on $C_3H_6$ | 1.0 | 1.2 | 0.98 | 0.78 | 0.63 | 0.7 | 0.71 | 0.65 | 0.62 | 0.69 | 0.70 |
| Wt. Percent $H_2O$ on Total $C_3$'s | 0.088 | 0.12 | 0.03 | 0.047 | 0.04 | 0.04 | 0.04 | 0.04 | 0.036 | 0.036 | 0.034 |
| Adduct in Grams: | | | | | | | | | | | |
| Beginning | 412 | 251 | 231 | average 723 | average 719 | average 771 | average 773 | average 756 | average 852 | average 852 | average 852 |
| End | 395 | 244 | 157 | | | | | | | | |
| Percent Adduct on Wt./hr. of $C_3H_6$ | 49 | 30 | 23.5 | 90 | 89.5 | 95.8 | 96.2 | 94 | 106 | 106 | 106 |
| Gaseous Feed Rate in C. F. H | 40 | 40 | 40 | 39 | 39 | 39 | 39 | 39 | 39 | 39 | 39 |
| Polymer Yield on $C_3H_6$ | 104 | 101 | 107 | 99 | 98 | 96 | 107 | 95 | 106 | 100 | 103 |

| Run No | 12 | 13 | 14 | 15 | 16 | 17 | 18 | 19 | 20 | 21 | 22 |
|---|---|---|---|---|---|---|---|---|---|---|---|
| Duration In Hours | 54.8 | 79.0 | 81.0 | 74 | 84 | 68 | 3 | 105 | 74 | 78 | 48 |
| Aver. Max. Temp., °F | 195 | 215 | 184 | 180 | 185 | 189 | 181 | 180 | 206 | 181 | 177 |
| Pressure, p. s. i. g | 500 | 500 | 500 | 500 | 500 | 500 | 500 | 500 | 500 | 500 | 500 |
| Mol percent $BF_3$ on $C_3H_6$ | 0.56 | 0.53 | 0.51 | 0.70 | 0.53 | 0.53 | 0.31 | 0.47 | 0.51 | 0.48 | 0.54 |
| Wt. percent $H_2O$ on Total $C_3$'s | 0.095 | 0.095 | 0.09 | 0.02 | 0.13 | 0.09 | 0.02 | 0.05 | 0.06 | 0.01 | 0.05 |
| Adduct in Grams: | | | | | | | | | | | |
| Beginning | average 485 | average 325 | average 325 | average 390 | average 390 | average 390 | average 484 | average 484 | average 190 | average 190 | average 250 |
| End | | | | | | | | | | | |
| Percent Adduct on Wt./hr. of $C_3H_6$ | 57.4 | 38 | 38 | 47.3 | 47.3 | 47.3 | 59 | 62 | 23.6 | 23.6 | 31.1 |
| Gaseous Feed Rate in C. F. H | 41 | 41 | 41 | 40 | 40 | 40 | 39 | 37 | 39 | 39 | 39 |
| Polymer Yield on $C_3H_6$ | 100 | 106 | 98 | 115 | 96 | 108 | 103 | 106 | 115 | 110 | 107 |

EXAMPLE VII

The advantages of operating in accordance with the teachings of the present invention is further illustrated in a series of runs wherein a mixture of about 49 percent propylene, 50 percent propane, and 1 percent lighter hydrocarbons was used as a reactor charge. The results of these runs are given in Table VI below:

Table VI

| Run No | 1 | 2 | 3 | 4 | 5 | 6 | 7 | 8 | 9 |
|---|---|---|---|---|---|---|---|---|---|
| Duration in Hours | 97 | 97 | 107 | 24 | 107 | 55 | 100 | 117 | 54 |
| Aver. Max. Reactor Temp., °F | 201 | 212 | 188 | 186 | 207 | 214 | 225 | 231 | 196 |
| Pressure, p. s. i. g | 500 | 500 | 500 | 500 | 500 | 500 | 500 | 500 | 500 |
| Mol Percent $BF_3$ on $C_3H_6$ | 0.53 | 0.55 | 0.67 | 0.68 | 0.93 | 0.32 | 0.13 | 0.15 | 0.19 |
| Wt. Percent $H_2O$ on Total $C_3$'s | 0.03 | 0.03 | 0.04 | 0.04 | 0.04 | 0.02 | 0.04 | 0.04 | 0.04 |
| Adduct in Grams | average 800 | average 800 | average 800 | average 800 | average 800 | average 800 | average 721 | average 721 | average 721 |
| Percent Adduct on wt./hr. of $C_3H_6$ | 108 | 108 | 118 | 118 | 118 | 118 | 106 | 106 | 106 |
| Feed Rate in C. F. H | 35.8 | 35.8 | 32.8 | 32.8 | 32.8 | 32.8 | 32.8 | 32.8 | 32.8 |
| Wt. Percent Polymer on $C_3H_6$ | 96 | 108 | 93 | 93 | 98 | 102 | 93 | 97 | 104 |

EXAMPLE VIII

An analysis of several further runs on refinery $C_3$ gases illustrates the disadvantage of operating the present process with too little adduct in the reactor. Table VII summarizes the results of this group of runs.

of amounts of adduct below about 14 percent by weight has no affect on the polymer yield as compared to the yields obtained in Table IV when no adduct was employed and equivalent amounts of $BF_3$ and water were added and the presence of between about 14 percent and 20 percent by weight of adduct produces only slightly better yields than those obtained with no adduct. On the other hand, a comparison of the results of Table VII with those of Tables V and VI shows that substantially improved polymer yields are obtained under essentially the same conditions if an amount of adduct catalyst in excess of about 20 percent based on a unit weight of Table VII

| Run No | 1 | 2 | 3 | 4 |
|---|---|---|---|---|
| Duration in Hours | 41 | 20 | 29 | 12.8 |
| Average Reactor Max. Temp., °F | 178 | 170 | 185 | 168 |
| Pressure, p. s. i. g | 500 | 500 | 500 | 500 |
| Mol Percent $BF_3$ on $C_3H_6$ | 0.63 | 0.57 | 0.71 | 0.99 |
| Wt. Percent $H_2O$ on Total $C_3$'s | 0.05 | 0.03 | 0.09 | 0.04 |
| Adduct in Grams: | | | | |
| Start | 254 | 45 | 30 | 144 |
| End | 58 | 60 | 261 | 86 |
| Percent Adduct on Wt./hr. of $C_3H_6$ | 19.4 | 6.52 | 18.1 | 14.0 |
| Feed Rate in C. F. H | 39 | 39 | 39 | 40 |
| Wt. Percent Polymer on $C_3H_6$ | 80 erratic | 36 decreasing | 81 erratic | 45 decreasing |

It is to be observed from a consideration of the results shown in Table VII that polymer yields of 81 percent by weight were the highest obtained when quantities of adduct catalyst below about 20 percent by weight based on a unit weight of propylene feed per hour were employed. Comparing the data of Table VII with the data reported in previous Table IV, it is clear that the presence of propylene per hour is present in the reactor.

The pilot plant data summarized in the preceding examples illustrate clearly the advantages of polymerizing normally gaseous olefinic hydrocarbons in accordance with the present invention. These advantages may be briefly summarized as follows: continuous operation, substantially improved yields of polymer, improved start-up and operation, substantially reduced requirements of expensive BF$_3$, production of polymer at consistently high rates, production of polymers of improved quality, and numerous other incidental advantages.

The preferred mode of operation in accordance with the present invention may be summarized as follows:

A suitable reactor is charged with a normally gaseous hydrocarbon mixture containing propylene, gaseous BF$_3$ and water to build up a predetermined inventory of adduct catalyst. The hydrocarbon mixture employed may be the same as the mixture to be polymerized in subsequent operations, or it may be different provided the gas contains substantial amounts of propylene. It is obvious that operation would be greatly simplified by using quantities of the hydrocarbon stream which is to be converted in the main polymerization reaction. A comparatively wide range of temperatures and pressures, for example 125° F. to 315° F. and 150 to 770 p. s. i. g., may be employed. BF$_3$ may be charged at a rate of about 0.3 to 4 mol percent based on the propylene content of the gas mixture, while water concentrations of 0.01 to 0.5 percent by weight based on the total content of C$_3$ gases are effective. Although BF$_3$ and water concentrations equivalent to those which will be set forth hereinafter for the polymerization reaction may be employed, it is usally advantageous to employ higher BF$_3$ and water concentrations in order to reduce the time necessary to obtain the desired quantity of adduct.

Having prepared the desired quantity of adduct in the polymerization reactor or in a separate unit, the reactant gas is continuously passed through a polymerization reactor at a rate dependent upon the quantity of adduct catalyst present in the reactor. For example, at a feed rate of about 700 g./hr. of propylene at least 100 grams, and preferably between 140 and 840 grams, of adduct catalyst must be present. Expressed in more convenient terms, at least 14 percent, and preferably 20 to 120 percent, by weight of adduct based on a unit weight of propylene feed per hour must be employed.

As has been pointed out above, a portion of the reactor effluent may be recycled to the reactor at a point near the reactant inlet in order to stabilize the reactor temperatures. The remainder of the reactor effluent or the total effluent, as the case may be, is preferably passed through an adduct separator wherein entrained addut is separated from polymer product by settling or other suitable means. The separated adduct is recycled to the reactor for further use as a reaction promoter. The polymer product, after adduct separation, may be passed through a suitable filter, such as a bed of sand, glass wool, stainless steel wool, etc., to separate residual amounts of adduct which cannot be separated by settling. Although this filtration step is not essential to the operation of the instant process, a product of improved clarity and purity will be obtained. The clarified polymer product may then be fractionated to remove small amounts of gaseous BF$_3$ which may be recycled to the reactor or disposed of as desired. This gaseous BF$_3$ is ordinarily present in extremely minute quantities in the product stream, and, although its source has not definitely been established, it is believed that slight decomposition of the adduct catalyst takes place during the course of the reaction. Polymer product which has been freed of gaseous BF$_3$ is then washed with caustic and water to remove any residual BF$_3$ which cannot be separated by fractionation. This product is then fractionated under pressure to remove residual gases, such as propane, which may be liquified for use as a fuel. The final polymer product recovered from this fractionation step represents the desired polymer composition of the present invention.

Another surprising discovery, which forms an essential feature of the instant invention, is that the novel adduct catalyst of this invention may be regenerated and/or maintained in a highly active state for an indefinite period of time by continuously or intermittently adding small amounts of BF$_3$ and water to the reaction chamber. Although the BF$_3$ is preferably added by metering predetermined quantities of this compound from a pressure cylinder directly to the reaction chamber, other suitable means of introduction may be employed provided the quantities introduced can be accurately measured. The quantities of BF$_3$ employed in accordance with the present invention should be just sufficient to maintain the desired quantity of adduct in the reactor. Concentrations of BF$_3$ in the range of about 0.3 to 1.0 mol percent based on the propylene content of the feed have been found eminently suitable for the purposes of the instant invention. Larger amounts of BF$_3$ have been found to be wasteful and unnecessary, while smaller amounts fail to produce the high yields of high quality polymer obtained in accordance with the present invention. Water may conveniently be added to the reactor by direct injection of the water into the reactor. Other means of introducing water, such as absorption of the water in the reactant stream, may also be employed. Just sufficient water should be introduced to produce about 100 weight percent of polymer based on the propylene content of the hydrocarbon feed. These critical quantities of water are within the range of about 0.01 percent by weight based on the content of total C$_3$ components of the hydrocarbon feed.

Unlike the quantities of adduct catalyst and the quantities of regenerative BF$_3$ and water, the temperature and pressure conditions employed in the reaction are not highly critical and may be varied over a rather wide range without too great an affect on the polymer yield or quality. It has been found that temperatures from 125° F. to 315° F. may be employed, while pressures from 150 to 770 p. s. i. g. are effective. However, temperatures in the lower portion of the given temperature range and pressures in the neighborhood of about 500 p. s. i. g. are preferred. The efficiency of contacting under the reaction conditions outlined is also a non-critical variable. Complete reaction has been obtained in up-packed reaction chambers as well as in packed reactors.

The range of olefinic reactants which may be polymerized by following the teachings of the instant invention is also quite broad. For example, it has been found that ethylene present in a refinery by-product gas mixture can be polymerized to the extent of about 36 to 41 mol percent based on ethylene content and butene-1 can be converted to the extent of about 77.5 mol percent.

It has further been found in accordance with the present invention that polymerized olefinic hydrocarbons, particularly propylene polymers, having low concentration of light polymers and a narrow molecular weight range can be prepared by practicing the process of the present invention. In contrast to the polymers heretofore prepared by the polymerization of propylene with Friedel-Crafts type catalysts, the polymers prepared in accordance with the polymerization process of the present invention are characterized by having less than 20 percent by weight of polymers with an average of less than 12 carbon atoms per molecule. In addition, the polymer products prepared in accordance with the present invention possess an extremely narrow molecular weight range, having in excess of 50 percent by weight of the total polymer corresponding to a fraction having an average of from 12 through 15 carbon atoms per molecule. Expressed in terms of boiling ranges, the novel propylene polymers of the present invention are characterized by having less than 20 percent by weight of polymer boiling below 333° F. and in excess of 50 percent by weight of polymer boiling between 333° F. and 518° F., all based on an atmospheric pressure of 760 mm. of Hg. Also, in accordance with the present invention, it is possible to shift the molecular weight range of the polymer product and to a certain extent further narrow the molecular weight range by fractionating the polymer produced and recycling to the polymerization reactor either light or heavy polymer depending upon the desired product.

In order to illustrate the novel nature of the polymers produced in accordance with the present invention a number of propylene polymers produced by the method described in Example VI were fractionated to separate a light polymer having an average of less than 12 carbon atoms per molecule and boiling below 333° F., a fraction having an average of 12 carbon atoms per molecule and boiling between 333° F. and 432° F., a fraction having an average of 15 carbon atoms per molecule and boiling between 432° F. and 518° F., and a heavy polymer having an average of more than 15 carbon atoms per molecule and boiling above 518° F. The results of these fractionations are summarized in Table VIII below:

Table VIII

| Sample Number | Weight Percent Below 333° F. | Weight Percent From 333° F.– 432° F. | Weight Percent From 432° F.– 518° F. | Weight Percent Above 518° F. |
| --- | --- | --- | --- | --- |
| 1 | 12.3 | 36.9 | 36.5 | 15.5 |
| 2 | 9.5 | 31.8 | 42.2 | 18.2 |
| 3 | 5.5 | 25.6 | 41.5 | 24.4 |
| 4 | 16.1 | 37.4 | 34.0 | 9.3 |
| 5 | 10.8 | 34.6 | 37.7 | 14.3 |
| 6 | 15.8 | 27.6 | 33.5 | 21.1 |
| 7 | 7.3 | 22.7 | 34.5 | 32.5 |
| 8 | 7.8 | 22.0 | 34.6 | 33.8 |
| 9 | 6.4 | 21.3 | 35.3 | 33.1 |
| 10 | 13.1 | 30.5 | 25.4 | 16.2 |

As has been pointed out above, the polymer products of the present invention are excellent base stocks for the preparation of sulfonate-type detergents. Although the entire polymer product may be employed for this purpose it is usually preferable to separate a selective fraction, such as a fraction having an average of 12 carbon atoms per molecule or a fraction having an average of 12 to 15 carbon atoms per molecule. The fraction selected is then employed to alkylate an aromatic hydrocarbon, such as benzene, xylene, etc., preferably in the presence of a Friedel-Crafts type catalyst. The alkylated aromatic is then sulfonated to form the corresponding alkyl aryl sulfonic acids, and these sulfonic acids are converted to sulfonates by reaction with a suitable basic-reacting material.

Having described and illustrated the nature of the instant invention, we claim:

1. The starting-up procedure for the polymerization of refinery by-product gases containing propylene which comprises continuously contacting said by-product gases with from 0.3 to 4.0 mol percent of $BF_3$ based on the propylene content of said by-product gases and from 0.01 percent to 0.50 percent by weight of water based on the total quantity of hydrocarbons having three carbon atoms per molecule present in said by-product gases at a temperature of 125° F. to 315° F. and a pressure of 150 to 770 p. s. i. g., continuously separating the product of said contacting step into a polymer phase and adduct phase, and continuously recycling said separated adduct phase, said contacting, said separating and recycling steps being carried out for a time sufficient to form from 14 percent to 120 percent by weight of adduct based on a unit weight of propylene feed per hour.

2. A process for the polymerization of hydrocarbon gases containing propylene comprising continuously contacting said gas with from 0.3 to 4.0 mol percent $BF_3$ based on the propylene content of said gas and from 0.01 percent to 0.50 percent by weight of water based on the total quantity of hydrocarbons containing three carbon atoms per molecule present in said gas at a temperature of 125° F. to 315° F. and a pressure of 150 to 770 p. s. i. g. for a time sufficient to form at least 14 percent by weight of adduct comprising $BF_3$, water and normally liquid hydrocarbons per unit weight of propylene feed per hour and thereafter contacting additional amounts of said gas with said adduct at substantially the temperature and pressure of said first-mentioned contacting step while adding from 0.3 to 1.0 mol percent of $BF_3$ based on the propylene content of said gas and from 0.01 percent to 0.10 percent by weight of water based on the total quantity of hydrocarbons having three carbon atoms per molecule present in said gas.

3. A process for the polymerization of hydrocarbon gases containing propylene comprising continuously contacting said gas with from 0.3 to 4.0 mol percent $BF_3$ based on the propylene content of said gas and from 0.01 percent to 0.50 percent by weight of water based on the total quantity of hydrocarbons containing three carbon atoms per molecule present in said gas at a temperature of 125° F. to 315° F. and a pressure of 150 to 770 p. s. i. g. for a time sufficient to form 20 percent to 120 percent by weight of adduct comprising $BF_3$, water and normally liquid hydrocarbons per unit weight of propylene feed per hour and thereafter contacting additional amounts of said gas with said adduct at substantially the temperature and pressure of said first-mentioned contacting step while adding from 0.3 to 1.0 mol percent of $BF_3$ based on the propylene content of said gas and from 0.01 percent to 0.10 percent by weight of water based on the total quantity of hydrocarbons having three carbon atoms per molecule present in said gas.

4. A process for the polymerization of refinery by-product gases containing propylene comprising continuously contacting said gas with from 0.3 to 4.0 mol percent of $BF_3$ based on the propylene content of said gas and 0.01 percent to 0.50 percent by weight of water based on the total quantity of hydrocarbons containing three carbon atoms per molecule present in said gas at a temperature of 125° F. to 315° F. and a pressure of 150 to 770 p. s. i. g., continuously separating the product of said contacting step into a polymer phase and an adduct phase, continuously recycling said separated adduct phase to said contacting step, said contacting, separating and recycling steps being carried out for a time sufficient to form from 20 percent to 120 percent by weight of adduct per unit weight of propylene feed per hour and thereafter contacting additional amounts of said gas with said adduct at substantially the temperature and pressure of said first-mentioned contacting step while adding from 0.3 to 1.0 mol percent of $BF_3$ based on the propylene content of said gas and from 0.01 percent to 0.10 percent by weight of water based on the total quantity of hydrocarbons having three carbon atoms per molecule present in said gas and continuing said recycling of said adduct.

References Cited in the file of this patent

UNITED STATES PATENTS

| | | |
| --- | --- | --- |
| 2,183,503 | McAlevy | Dec. 12, 1939 |
| 2,220,307 | Whiteley et al. | Nov. 5, 1940 |
| 2,357,926 | Bannon | Sept. 12, 1944 |
| 2,528,876 | Evering et al. | Nov. 7, 1950 |
| 2,588,358 | Carlson et al. | Mar. 11, 1952 |

UNITED STATES PATENT OFFICE
CERTIFICATE OF CORRECTION

Patent No. 2,855,447                                       October 7, 1958

William K. Griesinger et al.

It is hereby certified that error appears in the printed specification of the above numbered patent requiring correction and that the said Letters Patent should read as corrected below.

Column 1, lines 30 and 31, for "preparting" read -- preparing --; column 8, line 15, for "truns" read -- runs --; line 19, for "of" read -- to --; column 11, line 45, for "addut" read -- adduct --; column 12, line 25, for "0.01 percent by weight" read -- 0.01 percent to 0.1 percent by weight --; lines 40 and 41, for "up-packed" read -- un-packed --.

Signed and sealed this 10th day of February 1959.

(SEAL)
Attest:

KARL H. AXLINE
Attesting Officer

ROBERT C. WATSON
Commissioner of Patents